Patented May 3, 1932

1,856,524

UNITED STATES PATENT OFFICE

ALFRED WHITAKER, OF WEST DRAYTON, AND CECIL OSWALD BROWNE, OF EALING COMMON, LONDON, ENGLAND, ASSIGNORS, BY MESNE ASSIGNMENTS, TO RADIO CORPORATION OF AMERICA, OF NEW YORK, N. Y., A CORPORATION OF DELAWARE

PHOTOGRAPHIC RECORDING OF LIGHT VARIATIONS

Application filed May 21, 1929, Serial No. 364,900, and in Great Britain July 3, 1928.

The present invention relates to photographic recording of light variations. In many cases, the amount of light available for recording is limited, and the sensitivity of photographic emulsions is also limited. It is, accordingly, of great importance that as little of the available light as possible should be lost.

It is the object of the present invention to reduce the loss of light which has hitherto taken place.

According to the present invention, a light reflecting surface is arranged upon the opposite side of the photo-sensitive film or like surface to that upon which the light to be recorded falls in such a manner that the light, after passing through the sensitive emulsion, is substantially all reflected back to act once more upon the sensitive emulsion.

Figure 1:
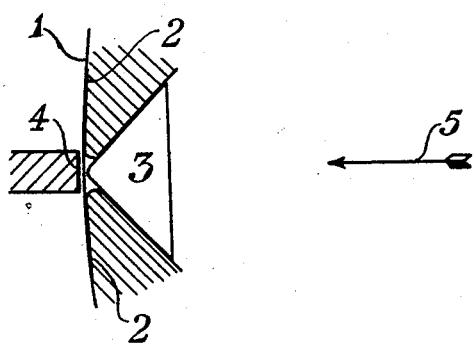
Figure 2:
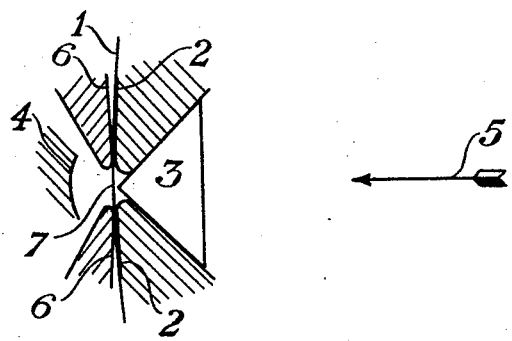
Figure 3:
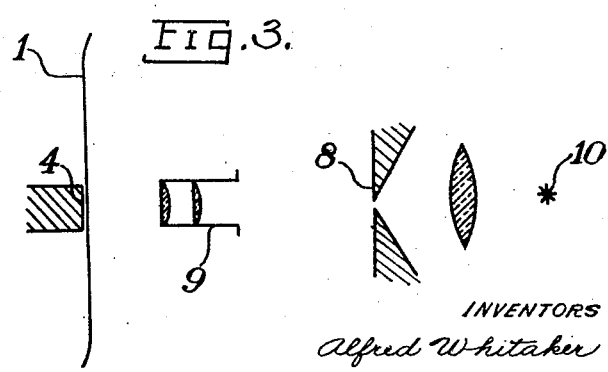

The invention will be described with reference to the accompanying drawings in which Figure 1 shows a modification of our invention as applied to one type of photographic sound recording apparatus;

Figure 2 shows a modification of our invention as applied to the same type of sound recording apparatus; and Figure 3 shows the first modification of our invention as applied to a different type of sound recording apparatus.

Referring to Fig. 1, a photographic film 1 is run over guide cheeks 2 between which is arranged a prism slit device 3 of the type, for example, described in our U. S. Patent No. 1,838,971, issued Dec. 29, 1931.

A reflecting surface 4 is arranged behind the film 1 as shown and the direction of the incident light is indicated by the arrow 5. Light falling upon the film 1 acts upon the sensitive emulsion thereon and the light which penetrates through the film is reflected back by the surface 4 to act once more upon the sensitive emulsion.

In the modified arrangement shown in Fig. 2, the film 1 is pressed against the guide cheeks 2 by means of a pressure foot 6 having a relatively wide slot 7 therein. This slot is of sufficient size to allow substantially all the light reflected by the surface 4 to reach the film 1. The reflecting surface 4 is in this case concave and is arranged at such a distance from the film 1 that the light which penetrates the film is reflected back and brought to a focus on the sensitive emulsion.

Fig. 3 shows an arrangement similar to that in Fig. 1 excepting that a so-called optical slit device is used. An image of the slit 8 is projected by means of the optical system 9 upon the film 1, the reflecting surface 4 being arranged as in Fig. 1. A pressure foot may be arranged to press the film into engagement with the reflecting surface 4 but this is not illustrated. The light source is in this figure indicated at 10.

No means for modulating the intensity of the light beam are illustrated in any of the figures but these may be of any known or suitable type.

In a modification, the film itself is given a backing of opaque and reflecting material and the separate reflecting means may be omitted.

We claim:

1. In apparatus of the class described, the combination of means constituting an effective slit device through which light passes, means for supporting and guiding a moving sensitive film in its movement past said device, and a light-reflecting member in the path of light passing through said device, said film passing between said device and member and said member reflecting back to said film substantially all the light which penetrates the film.

2. In apparatus of the class described, the combination of means constituting an effective slit device through which light passes, means for supporting and guiding a moving sensitive film in its movement past said device, and a mirror in the path of light passing through said device and arranged to reflect light back toward said device, said film passing between said device and mirror.

3. In apparatus of the class described, the combination of means constituting an effective slit device through which light passes, means for supporting and guiding a moving sensitive film in its movement past said first named means, a member for pressing said film into engagement with said supporting and guiding means, and means having a surface reflecting back to said film substantially all the light which penetrates said film.

4. In apparatus of the class described, the combination of means constituting an effective slit device through which light passes, means for supporting and guiding a moving sensitive film in its movement past said device, and a mirror in the path of said light passing through said device, said mirror having a concave surface arranged to reflect light back toward said slit device and said film passing between said device and mirror whereby substantially all of the light which penetrates the film is reflected back to the film.

5. Apparatus of the class described comprising in combination means constituting an effective slit device through which light passes, means for supporting and guiding a moving sensitive film in its movement past said device, means for pressing said film into engagement with said supporting and guiding means, and a light reflecting member in the path of said light passing through said slit device, said film passing between said slit device and member and said member reflecting back to said film substantially all of the light which penetrates the film.

6. Apparatus of the class described comprising in combination means constituting an effective slit device through which light passes, means for supporting and guiding a moving sensitive film in its movement past said device, means for pressing said film into engagement with said supporting and guiding means, and a concave mirror positioned in the path of light passing through said slit device and reflecting said light back toward said film, whereby all of the light which penetrates said film is reflected back to said film.

7. In combination, means constituting an effective slit device through which light may pass, means for supporting and guiding a moving film in its movement past said device, said film having its surface adjacent said device sensitive to light, and means on the opposite side of said film for reflecting light passed through said sensitive surface back onto said surface.

In testimony whereof we have signed our names to this specification.

ALFRED WHITAKER.
CECIL OSWALD BROWNE.